United States Patent [19]
Joline et al.

[11] Patent Number: 6,005,696
[45] Date of Patent: Dec. 21, 1999

[54] BACKHAULING TEST PROCEDURES FOR COMMUNICATIONS NETWORKS

[75] Inventors: Gary Joline, Lancaster, Pa.; Ray Giannantonio, Maple Shade, N.J.

[73] Assignee: Bell Atlantic Network Services, Inc., Arlington, Va.

[21] Appl. No.: 08/815,292

[22] Filed: Mar. 11, 1997

[51] Int. Cl.⁶ .................................................. H04B 10/08
[52] U.S. Cl. .............................. 359/110; 370/241; 379/29
[58] Field of Search .......................... 359/110; 370/241, 370/242, 249; 358/406; 375/224; 379/27, 29; 455/423

[56] References Cited

U.S. PATENT DOCUMENTS

| | | | |
|---|---|---|---|
| 4,870,638 | 9/1989 | Kawano et al. | 370/217 |
| 4,980,887 | 12/1990 | Dively et al. | 370/246 |
| 4,998,240 | 3/1991 | Williams | 370/251 |
| 5,195,124 | 3/1993 | Ishioka | 379/27 |
| 5,260,970 | 11/1993 | Henry et al. | 375/224 |
| 5,276,529 | 1/1994 | Williams | 358/406 |
| 5,375,159 | 12/1994 | Williams | 379/23 |
| 5,434,845 | 7/1995 | Miller | 370/252 |
| 5,457,729 | 10/1995 | Hamann et al. | 379/2 |
| 5,471,517 | 11/1995 | Nakagawa | 379/29 |
| 5,566,161 | 10/1996 | Hartmann et al. | 370/249 |
| 5,579,421 | 11/1996 | Duvall et al. | 385/14 |
| 5,586,111 | 12/1996 | Wise | 370/241 |
| 5,649,036 | 7/1997 | Anderson et al. | 385/16 |
| 5,729,692 | 3/1998 | Qiu et al. | 370/222 X |

*Primary Examiner*—Thomas Mullen
*Attorney, Agent, or Firm*—McDermott, Will & Emery

[57] ABSTRACT

A communications network having a plurality of distributed offices includes a test center at a central location for testing line and/or trunk circuits ('links') throughout the communication network. The links are selectively coupled to a maintenance port of a selected office and are backhauled from the maintenance port to the test center via a shared network serving a plurality of offices of the communications network. The shared backhaul network may use optical fibers connecting the offices to the test center or a SONET fiber optic ring. The test center includes a switch and test devices, such as digital test devices, optical test devices and protocol analyzers. The test center includes or is in communication with a central controller and one or more associated maintenance and operation consoles (MOCs). The central controller instructs a switch in the selected office to couple the link to be tested to the maintenance port where the shared backhaul network routes the circuit to a switch associated with the test center. The central controller also instructs the switch at the test center to selectively couple the link to a selected test device which initiates one or more tests and to report the test results to a MOC. Implementations are disclosed for testing of digital and optical communication links.

53 Claims, 6 Drawing Sheets

BACKHAULING TEST PROCEDURES FOR COMMUNICATIONS NETWORKS

TECHNICAL FIELD

The present invention relates to procedures and systems for testing distributed digital communications networks, particularly procedures and systems with backhauling bandwidth for a test procedure from a switch at a remote location to a test center.

BACKGROUND ART

Telephone companies are deploying a variety of new digital technologies to upgrade their networks and provide a wider range of communication services. Digital networks require protocol analysis and other testing to monitor performance and facilitate maintenance operations. In a typical installation, a protocol analyzer or other digital test device connects to a facilities access die (FAD) group type maintenance port on the digital switch. For test purposes, the switch breaks an identified communication link and routes the communications through the FAD port. Effectively, the test device is serially connected into the digital circuit under test. The test device passively monitors and analyzes the communication signals and passes the signals back through the port for routing to the appropriate destination without the subscriber's knowledge.

Figure 1:
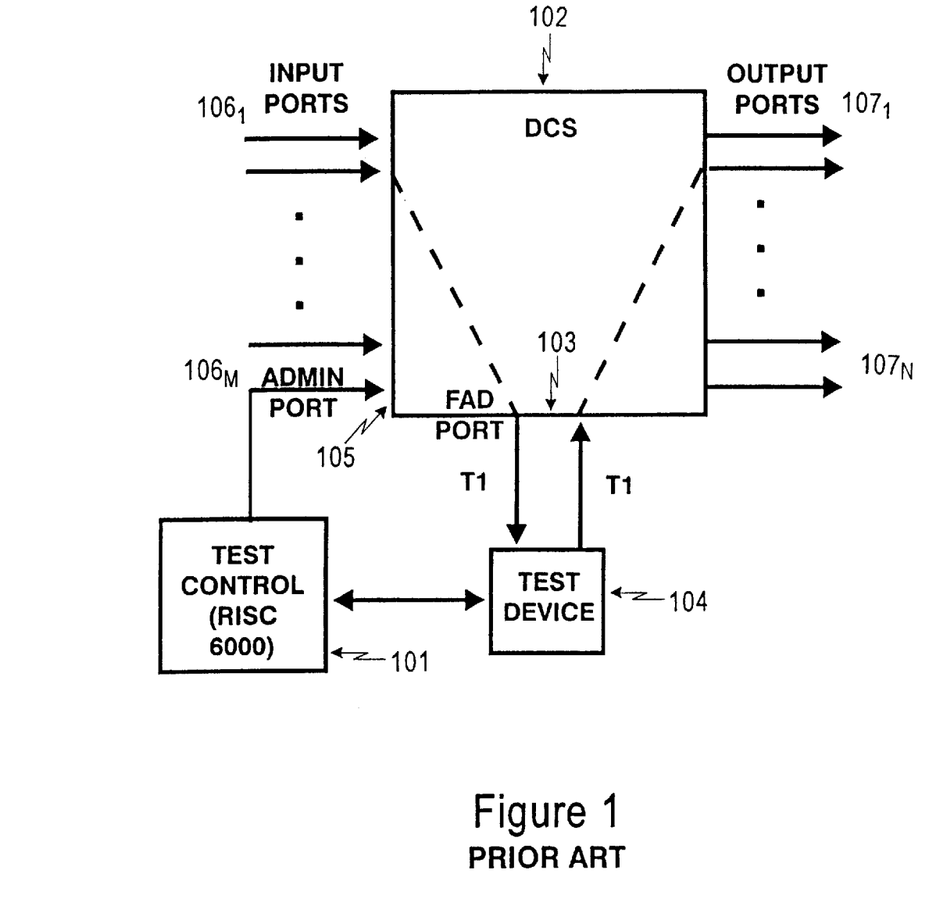
FIG. 1 is an illustration of the Prior Art method for testing circuits at a switching office of a distributed communications network.

An exemplary test system known in the art comprises the Hekimian React Model 2001 system implemented with other pieces of equipment as shown in FIG. 1. The React Model 2001 test control 101 is an operational support device having a graphical user interface (GUI) for testing the integrity of advanced data packet services. The devices can operate as either protocol analyzers or synchronous optical network (SONET) test devices. The test device is hooked up via the FAD group type maintenance port 103 to a digital cross-connect system 102 locally. In other words, the test device 104 is mounted near the digital cross-connect system 102, and a pair of T1 circuits connect the FAD port of the digital cross-connect system 102 to the test device 104.

The test control 101 controls mapping in the digital cross-connect system 102 through X.25 administrative port 105. When operations personnel want to test a T1 circuit that runs through the digital cross-connect system 102, a technician inputs a request into the test control 101. The test control 101 sends commands to the digital cross-connect system 102 to map the T1 circuit through the FAD port channels, i.e., to break the physical connection and make the T1 channel available at the facilities access die group maintenance port 103. The test die group 103 then feeds the circuit to be tested into the test device 104 where it passively runs through the test device 104 and then returns to the digital cross-connect system 102. All types of protocol analysis or other testing can be performed by test device 104. The test device 104 reports its test results to test control 101. When the testing is done, the circuit is remapped back to go from one of the input ports $106_1$ to $106_m$ to one of the output ports $107_1$ to $107_n$ of digital cross-connect system 102.

The testing system shown in FIG. 1 gives the network operations personnel the ability to test some of the fast packet services such as frame relay, SMDS, etc., as they are developed and included in the network. This requires adding test elements out in the field, such as in each central office of a public switched telephone network having the digital services capability. The system has the disadvantage that the test elements are only occasionally used for testing and hence are underutilized. Furthermore, if a test element becomes defective, then there is essentially no way to test circuits in that office. The maintenance of the testing system is then compromised.

Installation of such elements in many switching offices as shown in FIG. 1 can also become quite expensive as the network grows in a large service area. For example, wherever a fast data packet service is deployed in a switching office that has an SMDS switch, pieces of equipment, such as a Hekimian base model 6700 test unit with appropriate test cards and accesses, must be installed and coupled to the FAD port of each digital switch as well in order to accommodate the test system and test the service. This forces the network operator to incur the large expense of purchasing, installing and maintaining a large number of the test devices. Upgrading also is expensive because the operator must replace software in each test device or replace all of the test devices with improved models.

Even in systems with remote testing of digital communication links, a test device is required at the location of the circuit under test. For example, U.S. Pat. No. 4,998,240 issued to Williams on Mar. 5, 1991 discusses a system for remote testing of ISDN lines. A standard U-interface bus in the central office supplies D-channel data from the ISDN line to a personal computer at a central office which performs protocol analysis of the data. A second computer at a remote test facility communicates with the analyzer via a dial-up line. U.S. Pat. No. 5,260,970 issued to Henry et al. on Nov. 9, 1993 similarly discusses an ISDN protocol analyzer for insertion in a U-interface data stream between a central office and customer equipment. For other examples of testing systems using test devices at the location under test, see also U.S. Pat. Nos. 5,434,845, 5,276,529, 5,195,124 and 4,870,638.

U.S. Pat. No. 5,457,729 issued to Hamann et al. on Oct. 10, 1995 uses interoffice T1 trunks to provide remote access to links under test. However, the trunks connect an integrated digital service terminal (IDST) including relays to break an SS7 link under test. A digital protocol analyzer is coupled in series in the link in order to provide for coupling of the T1 trunk to the link and testing of the link.

U.S. Pat. No. 5,375,159 issued to Williams on Dec. 20, 1994 discusses a protocol analyzer for common channel signal links. The analyzer tests switch functions remotely via SS7 digital communication links. The protocol analyzer is located at a signal transfer point and is switchably connected to SS7 digital communication links between the STP and a plurality of central offices via a port selector. The port selector provides a switched selection of a particular central office under test and connects the protocol analyzer through the two ports coupled to the links to the particular central office to facilitate testing of that central office. The test capability of the system is limited to the interoffice SS7 signaling functionality of the central offices. The protocol analyzer apparently can not test the actual normal line side or trunk side communication links or facilities. Also, the links from each switching office to the central location are dedicated to the individual switching office and cannot readily be reallocated to other offices.

These known testing systems and procedures have various drawbacks. In particular, a test device has to be located at each one of the locations at which circuits are to be tested or connect to the switch at each location via dedicated facilities. Consequently, a large number of test devices are necessary to provide comprehensive testing ability for a large communications network. This in turn makes it more difficult and more expensive to implement, maintain and progressively upgrade testing of advanced communications services as those services are introduced and expanded in a network.

DISCLOSURE OF THE INVENTION

It is therefore an object of the present invention to provide a testing system and method in which it is not necessary to provide a large number of test devices at a number of different locations.

It is also an object of the present invention to provide a testing system and method in which testing of advanced communications services is facilitated and rendered less expensive.

It is a further object of the invention to provide a testing system and method having a group of analyzers and/or other test devices at one central location and backhauling of bandwidth from the office equipment providing the actual communication services to the central location.

It is also an object of the present invention to utilize selective coupling of line/trunk circuits to a maintenance port of a switch and backhauling bandwidth from the maintenance port to a test center via a shared use network serving a plurality of offices rather than by dedicated links or trunks.

In one aspect, the invention relates to a testing system for testing circuits in a distributed digital communications network. The testing system includes a test center having a plurality of test devices. A shared use network connects the test center to a plurality of communication switches. The communication switches may be located in a corresponding plurality of switching offices of the distributed digital communications network. For a test operation, a central controller of the system sends an instruction to one of the communication switches. The instruction causes the one switch to selectively couple a circuit to be tested to a maintenance port of the switch. The maintenance port connects to the shared use network which selectively connects the circuit to be tested to the test center. One of the test devices in the test center is controllably connected to the shared use network and hence to the circuit to be tested, and that test device remotely performs one or more tests of the circuit.

The shared backhaul network preferably utilizes wideband links, such as optical fiber. In one preferred embodiment, the backhaul network is a SONET, optical fiber ring. The test center preferably includes a switch for selective connection of the test devices. The test center includes or is in communication with the central control and one or more maintenance and operations consoles.

In another aspect, the invention relates to a testing method for testing circuits in a distributed digital communications network. The method includes the step of providing test devices for testing the circuits at a test center. The test center is connected to a plurality of switches via a shared use network. The switches are located in a corresponding plurality of switching offices of the distributed digital communications network. To conduct a test, the central controller sends an instruction to one of the switching offices. The instruction causes the switch in the switching office to selectively couple a circuit to be tested to a maintenance port of the switch. The maintenance port connects to the shared network, which connects the circuit to be tested from the switch to the test center. One of the test devices is controllably connected to the shared use network and hence to the circuit to be tested, and that test device remotely performs one or more tests of the circuit.

In yet another aspect, the invention relates to an improved testing center. The testing center includes a combination of test devices, at least one maintenance and operations console, and a central controller. All of the elements communicate with each other, for example, via a local area network. Alternatively, a signaling network may link the test center elements as well as provide signaling communications to the switching offices. The central controller instructs the combination of test devices to conduct one or more tests of the communication links of the distributed network in response to a test request entered by an operator at the maintenance and operations console. The testing center also includes a digital or optical switch, for connection to the switching offices in the distributed communications network via a shared use network under control of the central controller, for selectively connecting the links to be tested to the test devices.

In another aspect, the invention relates to a method of carrying out the testing of links or circuits in a distributed digital communications network. The method includes the step of displaying a graphical user interface on a display of a maintenance and operations console. Inputs from an operator of the console are received which constitute a request to test one or more circuits in the distributed digital communications network. In response to the test request, the test center is connected to one of the communication switches included respectively in the distributed digital communications network via the shared backhaul network. An instruction is sent to the one of the switches to interrupt a circuit to be tested and couple that circuit to a maintenance port. The maintenance port is then connected to the test center via the shared network. An instruction is sent to one or more test devices to remotely perform one or more tests of the circuit.

In operation of one embodiment, for example, the central control instructs a central office digital switch to couple a selected circuit to the FAD port of a switch in a desired switching office in a manner similar to that in the single test set installation described above. However, in the presently preferred embodiment of the invention, a SONET ring routes the T1 channel from both sides of the FAD port to the switch associated with the test center. The central control also instructs the switch at the test center to couple the T1 channels to an identified one of the test sets and instructs that test set to initiate one or more tests. The test set reports results through an X.25 network to the central control for display on one of the MOCs.

The present invention encompasses embodiments adapted for testing of electrical circuits passing through digital switches. Another embodiment provides backhaul transport of optical signals tapped from the actual optical communication link, to facilitate remote optical and protocol testing of optical links.

Thus, another aspect of the invention relates to a test system specifically adapted for testing optical communication links. This test system includes first optical splitters, for coupling to a first set of optical fibers of the distributed communication network and tapping off optical signals from the fibers. A first optical switch selectively couples the tapped optical signals from the first optical splitters to a port. The test system further includes second optical splitters, for coupling to a second set of optical fibers and tapping off optical signals from those fibers. A second optical switch selectively couples the tapped optical signals from the second optical splitters to a port. At a remote test center or the like, the system provides a third optical switch. Optical fibers are coupled between the ports of the first and second optical switches and the third optical switch. Test devices, coupled to the third optical switch, are responsive to optical signals, e.g. for measurement of optical characteristics and/or for performing protocol analysis.

Rather than locating test devices in each respective office or remote location, an important feature of the present invention is the concentration of the test devices in a central location. Via software with administrative capabilities to the remote switch locations, the network maps the test circuit bandwidth back to the test devices at the central location in order to do the actual testing. At different times, any one test device can test circuits in any or all of the switches on the network. Consequently, the invention enables better utilization of the test sets because the amount of testing performed by each increases. Furthermore, complete maintenance of the testing system would be facilitated because personnel would only have to go to one location to fix or upgrade the test sets. Moreover, if there is a defective test device, then it can be turned off and another test device in the central location can be used instead.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 2:
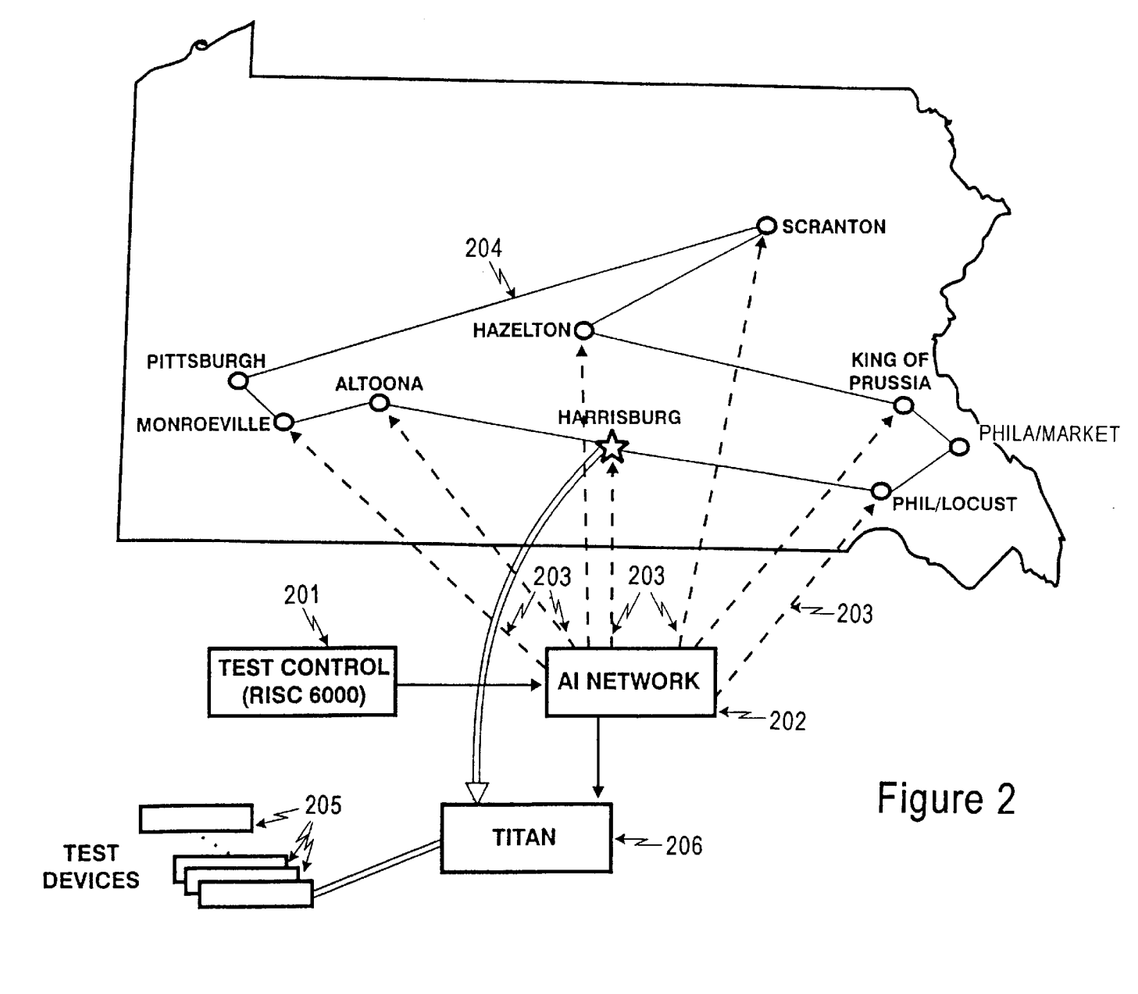
FIG. 2 is an illustration of the overall architecture of a distributed communications network utilizing the present invention.

FIG. 2 is an exemplary illustration of the architecture for a testing system according to the invention implemented in a large distributed digital communications network having a number of switching offices. In this description, the term 'communication switch' refers to a switch providing actual communication services to one or more end users or customers. In the preferred implementations, the communication switches provide switched, broadband digital communications. One example of such a communication switch is a digital cross-connect switch (DCS) providing switched T1 services, although the invention enables centralized testing of other types of digital circuits through switches providing either higher or lower rate digital services. The communication switches may offer static or dynamically switched connectivity.

The communication network includes a number of disparately located 'offices.' The offices include various routing and control equipment, such as the communication switches, for providing the communication services to customers. The terms 'circuits' and 'links' are used interchangeably to broadly encompass a range of electrical and optical media for transporting communication signals.

The network to be tested may be, for example, a comprehensive switched network providing digital communications services to a wide range of subscribers. The network may provide dynamic or static switching services. Examples of the digital communications services include static and dynamically switched T1 services, permanent virtual circuit and switched virtual circuit Asynchronous Transfer Mode (ATM) services, Switched Multimegabit Data Service (SMDS) and frame relay service. The subscribers may include residential subscribers, receiving conventional telephone services, but the typical network currently provides business subscribers advanced high bandwidth data communications services such as frame relay and switched multi-megabit data service (SMDS). The connection to the network by subscribers may range from a simple line circuit to a switching office of the network along with many line circuits in the case of a residential subscriber, up to a dedicated T1 line to the network in the case of a large business subscriber. Digital trunk circuits, at T1 and higher rates, interconnect the switching offices.

The illustrated network and test system is a simplified representation of an implementation developed by applicants for use in the state of Pennsylvania to test a public network providing high bandwidth digital communication services. Certain switching offices located at various cities needing testing, such as protocol analysis, are marked in FIG. 2. Each one of the switching offices is connected to the test control 201 via an administrative (AI) network 202. The architecture of a modern test system, such as the Hekimian Model 2001 test system, is extensive, but a key element of the system is a software control program which resides in a RISC 6000 computer which drives the test requests to the switching offices. There can be a local area network (LAN) supporting multiple terminals constituting the test control 201. The switching offices are controlled through interoffice signaling channels 203 the AI Network 202 controlling the switches in the switching offices through use of the central test control 201.

The system can use T1 lines from each switching office, but preferably a ring 204 is employed that runs through all of the offices and back to a central location (e.g., in Harrisburg). The ring 204 passes through all of the switching offices so that the output of the switching offices can be made available at a central location performing testing of circuits at each one of the central offices. The ring 204 may be, for example, an OC-3 SONET fiber optic ring or other type of large bandwidth ring. In the example, the ring 204 is connected through each of the named switching offices and then back to Harrisburg. Therefore, circuits at a switching office in Pittsburgh, for example, can be multiplexed onto the ring and routed through Altoona and Monroeville and be tested at the central location through the Harrisburg office. Routing on the ring 204 is also under the software direction of the test control 201.

There is a connection from the Harrisburg switching office to a digital cross-connect switching system such as a TITAN 31 or AT&T DCS4 in a central location. All of the test devices, such as protocol analyzers 205 for testing the protocol vital signs (PVS) of the communications network, are placed in the central location. Although protocol analyzers are implemented in the system shown in FIG. 2, the terms "test device" and "test set" are used generically in this application and are defined to cover any type of testing device including, but not limited to, the protocol analyzers. The mapping and transport of a circuit to be tested or groups of circuits to be tested back to the protocol analyzers at the central location is controlled over the administrative (AI) network 202. The mapping includes the ability to control the T1 outputs of the TITAN 206 switch to connect circuits under test to different test resources.

Essentially, the TITAN switch 206 and the test devices form a remote test center. The test control 201 may be part of such a test center. Alternatively, the control 201 may be separate and communicate with one or more test centers under its control via a data signaling network.

Figure 3:
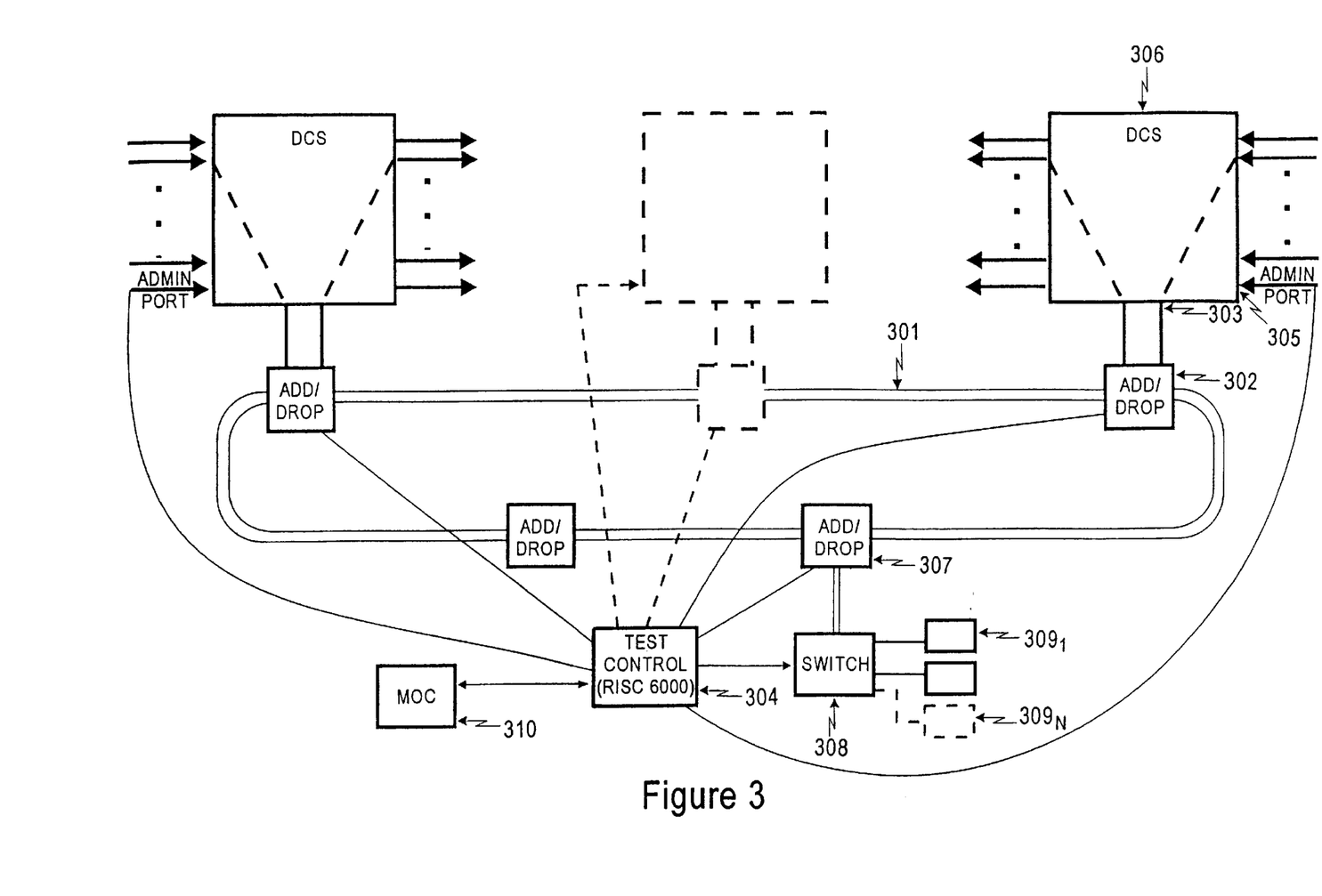
FIG. 3 is an illustrative diagram of the overall architecture of a testing system for testing circuits at switching offices of a distributed communications network in a preferred embodiment of the invention.

FIG. 3 is an illustrative diagram of the overall architecture of a testing system in a preferred embodiment of the invention using a SONET ring 301 with add/drop multiplexers 302. The fiber optic ring technology provides redundancy in case of failure anywhere in the system.

The digital cross-connect systems 306 forming the communication switches may have a number of FAD ports, such as 12, and a much larger number of regular service ports. The FAD ports are physically unique and separate from the regular service ports and have a dedicated set of terminations. Each FAD port provides two circuit connections, e.g. two T1 circuits coupled through the switch to opposite ends of the circuit under test, to serially impose a test device into the circuit under test in a manner similar to that discussed above relative to FIG. 1. In the invention, however, the ring 301 backhauls the two circuit connections to a centralized test system. The add/drop multiplexers 302 on the ring 301 connect to the FAD maintenance ports 303 of the digital cross-connect systems 306 which form the communication switches of the communication network switching offices. The test control 304 connects through signaling channels to the administrative ports 305 of the switches 306.

Although shown as a physical connection in FIG. 3, the signaling link between test control 304 and each administrative port 305 is a logical link through a packet data network, such as an X.25 signaling network, preferably a 9.6 kbps connection. Those skilled in the art will recognize that various other appropriate signaling networks can be utilized. However, the network management functionality must be extremely secure because it interfaces with all of the switches.

In a presently preferred embodiment of the invention, the SONET ring 301 is of relatively high bandwidth and selectively provides two T1 channels between each FAD port and a digital switch 308 at the central testing location. Another add/drop multiplexer couples the switch 308 to the ring 301. One or more of the digital cross-connect systems 306 receives T3 circuits and couples both ends of a T1 line to be tested to the FAD group maintenance port 303. The T1 circuits of the FAD port are multiplexed onto the SONET ring 301 by add/drop multiplexer 302. The digital switch 308 couples to the T1 channels on the ring via the add/drop multiplexer 307. The digital switch 308 at the central station selectively couples the T1 channels to individual test devices 309. The central test control 304 communicates with each digital switch 306, 308, with the add/drop multiplexers 302, 307 and with each of the test devices $309_1$ to $309_n$ via an X.25 signaling network and/or a LAN, to set up connections and execute specific circuit tests.

In particular, the connections in the DCS 306 are mapped by control signals received from the central test control 304.

Once mapped to the maintenance port 303, a sequence of mapping events takes place simultaneously in each one of the add/drop multiplexers 302 to allocate the bandwidth necessary to bring the T1 signal back over the SONET ring 301. In particular, the central test. control 304 controls the add/drop multiplexer 307 associated with switching unit 308 and test devices $309_1$ to $309_n$. The multiplexing of test signals from multiple switches 306 over the SONET ring 301 and the mapping of ports and T1 lines on SONET ring 301 is carried out by network management control software within the central test control 304. Those skilled in the art would recognize that the bandwidth and channelization of the SONET ring 301 could be managed in any number of different ways, such as time division multiplexing, wavelength division multiplexing, etc. See, for example, the disclosure and background discussion in U.S. patent application Ser. No. 08/656,879 filed on May 30, 1996, now U.S. Pat. No. 5,880,864, which is hereby incorporated by reference in its entirety. In any event, the mapping tables and other information necessary for such network management are preferably located in and managed by central control 304.

The switch 308 selectively connects the T1 channels on the SONET ring 301, carrying the circuit(s) to be tested, to various ones of the test devices $309_1$ to $309_n$ in response to the instructions from central test control 304. The connection of various test devices can be in accordance with requests by an operator in order to, for example, provide relative comparison of test devices or easily provide alternate testing devices if one testing device becomes inoperable or is taken off-line for any reason. Alternatively, the switching functionality can couple different types of test devices to a circuit under test, to perform different types of digital circuit tests.

Test control 304 also connects to one or more operators terminals, such as the illustrated maintenance and operations console (MOC) 310, which interfaces with operators to manage testing functions associated with the testing system as well as other functions related to operation and maintenance of the network. As explained in more detail below, each MOC 310 is responsive to test requests by an operator to send information to test control 304 regarding each desired request, so that the test control correspondingly controls the elements in the communication network and the testing system. Upon completion of the test(s), the test control 304 also forwards the test results to the MOC 310 for display to the operator.

In an important aspect of the invention, the test devices $309_1$ to $309_n$ can be freely replaced, updated, reconfigured, etc., as desired in accordance with testing performed of the network. For example, one or more of the test devices can be configurable in order to test for any number of present or future testing protocols or services and to provide optimum traffic engineering. By providing a plurality of devices, one may be taken off-line for maintenance, replacement, upgrading, etc., while other devices perform testing in its place. The system should also facilitate more varied and thorough testing of circuits since devices can be compared for relative performance and some devices can be optimized for one test while other devices can be optimized for other tests. A testing device may be highly customized and still cost effective since it will be shared among and used for testing of a large number of switching offices.

Indeed, one or more of the devices at the testing center could be replaced by a monitoring system for simply monitoring the communications on a circuit in the network on a confidential basis. The operation of the testing system remains unchanged and the circuit connections would be selectively created and terminated as described elsewhere in this application. But instead of testing the performance of the circuit, the monitoring system could record or provide real-time reproduction of the substance of the communication on the circuit to be tested. In this way, the testing center could be utilized as a reliable means of "wiretapping" by law enforcement agencies. Particularly advantageous is the fact that monitoring of all of the circuits in the network could be carried out at a single location. Furthermore, the monitoring/recording device would appear no different to the central controller than a test device and could be implemented easily.

As described in more detail below, the testing carried out by the devices according to the invention is at a lower level than the functions of connectivity management and bandwidth management on the shared backhaul network. In this way, the testing devices can be changed without interruption of the connectivity management performed by the testing system.

An important feature of the testing system is that the routing between the SONET ring 301 and the test devices 309 and the routing through switching unit 308 are dynamically allocated by the centralized test control 304. The allocation of bandwidth on the SONET ring 301 is dynamic even if there is only one testing center. Also, in a communications network sufficiently large to warrant a number of central testing locations, the test control 304 for each testing location would also contain table and message sets indicating the allocation of switching offices among the testing locations. The allocation of switching offices may be changeable so that if there is an interruption in the testing system, circuits to be tested can be rerouted to an alternate test center through changes in the test control(s) 304. Through the software in test control 304, various capabilities can also be assigned individually to large users of the network as well.

The SONET ring 301 carries out the function of backhauling the circuits from the switching offices to the test center through the dynamic allocation of the bandwidth from each switching office. The ring 301 has a large bandwidth capable of carrying a predetermined number of channels. For example, the ring may be capable of carrying a DS3 comprising 28 T1 or DS1 channels. Even though some of the channels may be dedicated to testing of an office, the allocation of additional channels by test control 304 is always controllable on the fly. The bandwidth is dynamically allocated so that each office can be individually tested as needed. For example, at one point in time, six channels on ring 301 may be allocated to test circuit transport between the switch in Scranton and the test center in Harrisburg. A short time later, the same six channels could be reallocated to Scranton or two channels allocated to Scranton and four channels allocated to test circuit transport between the switch in King of Prussia and the test center in Harrisburg. However, the allocation of these channels is dynamic and hence the SONET ring 301 is shared by all of the switching offices under instructions from test control 304.

If a switching office is very remote and does not have the SONET ring 301 at its location, then a pair of T1 lines can be run to the closest node on the SONET ring 301. While the T1 lines would be dedicated from the output port of the switch to where they terminate on the SONET ring, the channel for testing then becomes part of the shared network backhauling bandwidth from all of the switching offices back to the test center where the channels are always dynamically allocated.

As mentioned previously, the sharing of SONET ring 301 is administered by software within test control 304 by administering the bandwidth, putting the test device onto a circuit, and sending out the signaling to make the connections between the circuit and the test device. The software is similar to that used to carry out connections in a high bandwidth digital communications network. However as applied in this invention, the network management control is used for administering the backhauling of circuits for testing to a central location instead of services for the primary communications customers.

Figure 5:
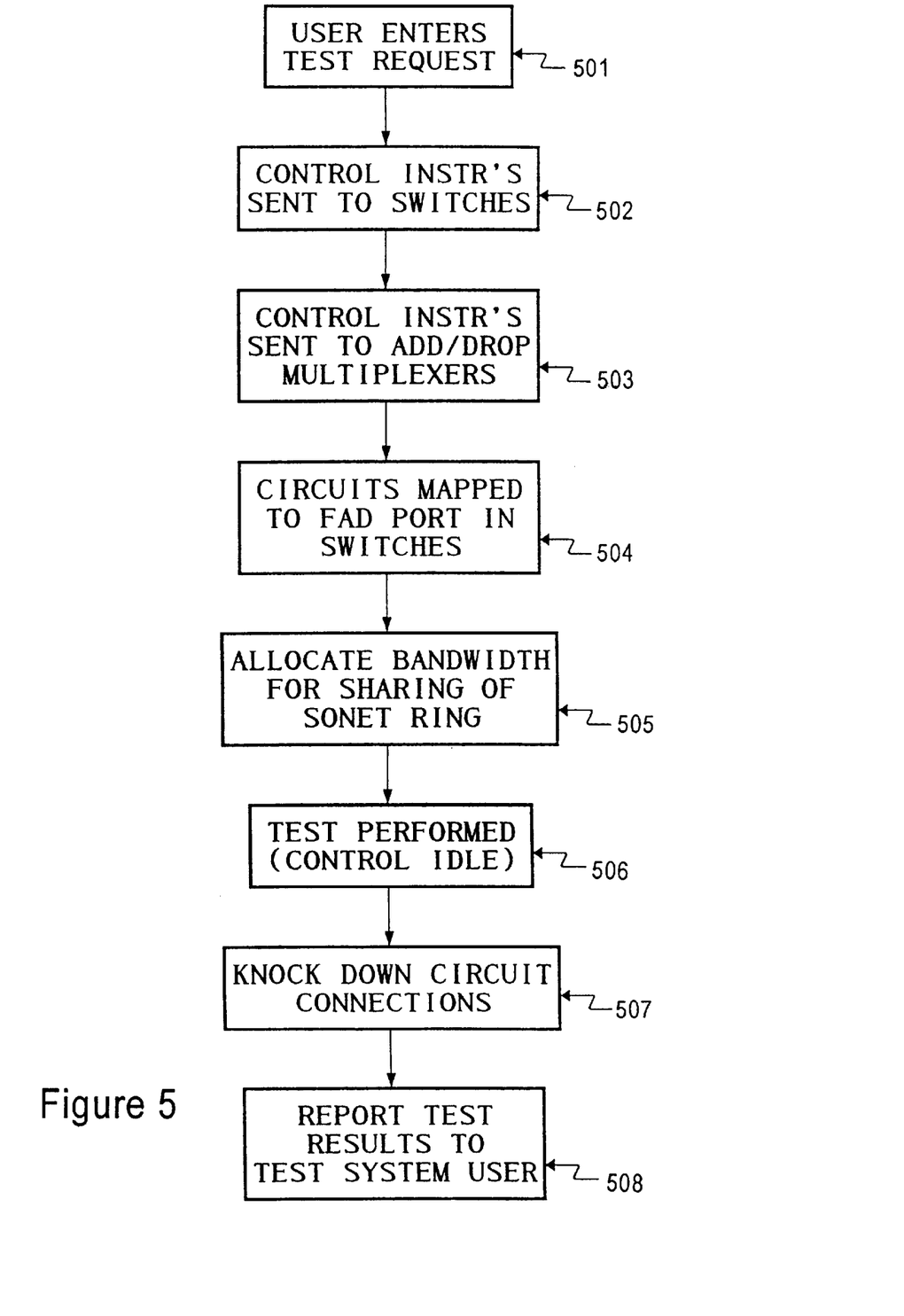
FIG. 5 is a flowchart outlining the process of connecting a circuit for testing in a preferred embodiment of the invention.

A flowchart outlining the process of connecting a circuit for test is shown in FIG. 5. The process is initiated by a user entering a request for a test at a maintenance and operations console (MOC) 310 connected to test control 304 in the test center (step 501). The test control 304 receives the request, and network management control software running at the test control 304 provides instructions to the communication switches 306 of the switching offices (step 502) and to the add/drop multiplexers 302, 307 or other equivalent ring devices (step 503). The instructions to the communication switches relate to the parameters of the test requested by the user. For example, in addition to identifying the circuit(s) to be tested (and thus mapped to be made available at the FAD port 303), the instructions may specify the duration of the connection. The instructions to the add/drop multiplexers 302, 307 or other equivalent ring devices relate to the bandwidth which should be allocated on the bandwidth of SONET ring 301 and could specify, for example, the channel on which a corresponding circuit to be tested is backhauled to the switch 308 in the test center. Those skilled in the art would recognize that the channels of the SONET ring 301 could be managed in any number of different ways, such as time division multiplexing, frequency multiplexing, etc. In any event, the mapping tables are preferable located in and managed by central controller 304.

The administrative X.25 network of course does not actively take steps, it merely provides a path to deliver the instructions. After the instructions are delivered, the circuits are mapped at the switching offices in conjunction with each other (step 504). In response to an instruction for a test received at administrative port 305, the communication switch 306 provides the circuit(s) to be tested at the FAD port 303. For example, a circuit to be tested between the input port(s) and output port(s) of the communication switch 306 could be provided to the FAD port 303 as shown by the dotted line in FIG. 3. Substantially simultaneously therewith, the add/drop multiplexer 302 associated with the switching office provides a two-channel connection for the two legs of the circuit to be tested onto one or more channels of the SONET ring 301. The add/drop multiplexer 301 is also controlled at substantially the same time in order to receive the circuit(s) to be tested and provide them to the switch 308 of the testing center. The bandwidth of the entire SONET ring 301 is dynamically allocated so as to provide for the backhauling of the circuit(s) to be tested to the test center in response to the instructions from the test control software (step 505). The switch 308 is also controlled substantially simultaneously in accordance with the specific test requested by the user of MOC 310 and provides the circuit(s) to be tested to an appropriate one or more of the testing devices $309_1$ to $309_n$.

Once all of the connections are made in accordance with the instructions, the network management control software becomes idle while the test system performs its test of the connected circuit (step 506). The test device 309 does not know the origin of the circuit connected to it by the test control software. When the test is completed, the test control software sends out instructions to knock down the connections made in steps 504 and 505 (step 507). Although available anytime, the test results are preferably displayed to the operator via the MOC 310 upon completion of the test.

Figure 4:
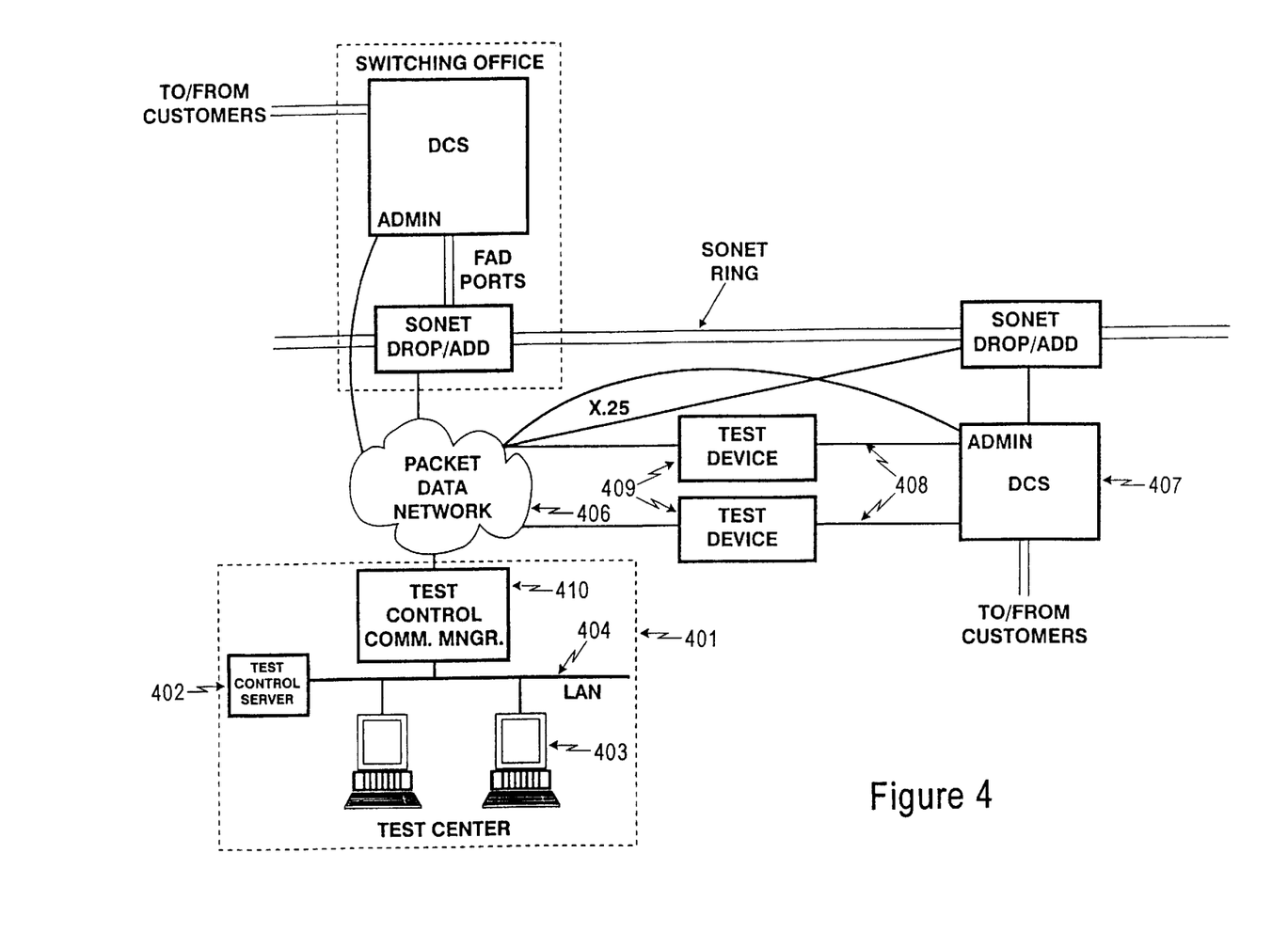
FIG. 4 is a block diagram showing the connection of elements at a particular part of the testing system, with emphasis on the central test location, in a preferred embodiment of the invention.

FIG. 4 shows the preferred embodiment of the invention in somewhat different form in order to better illustrate the use of the testing system by an operator. In particular, the test center 401 is shown in more detail in order to illustrate that it may comprise a local area network (LAN) 404 connected to elements serving as the test control. Here, the test control is implemented as a server 402 and a communications manager 410.

A plurality of monitors, personal computers and/or workstations are provided as MOCs 403 for operators to exercise maintenance and control of the network, only a small part of which is shown in the remainder of FIG. 4. A central server 402 runs several different applications and provides users with menus. One of the applications run on the server 402 is the test control software, and one of the menus is a corresponding test menu relevant to the present invention. The instructions to the administrative ports of the switches, the SONET add/drop multiplexers and the test devices are generated by test control communications manager 410 and are all carried over the same packet data network 406. The test control software interacts with the operator through a MOC 403 to specify the circuit(s) to be tested, the test(s) to be conducted and, if necessary, the testing device(s) to be utilized in the test. Preferably, the parameters for each of the tests are predetermined and stored in a database of the central server 402, and once selection is made by the operator, the central server 402 transmits the information identifying the test to the test control communications manager 410 over the LAN.

The test control communications manager 410 performs the actual link management and acts as a coupling between the LAN and the X.25 signaling network. In particular, the manager 410 stores the mapping tables controlling the allocation of bandwidth (e.g., channelization) on the SONET ring 301 and generates the appropriate instructions to be transmitted to the add/drop multiplexers in accordance with the allocation of bandwidth that is present at the time the test request information is received from central server 402. The test control communications manager 410 then also transmits the appropriate instructions corresponding to the selected circuit(s), test(s) and test device(s) to the communication switches of the switching offices and also to the switch 407 associated with the test center.

The test devices 409 are connected by dedicated links 408 to any port of switch 407. The switch 407 may use a number of ports to serve customers and a number of ports dedicated to the test devices as shown in FIG. 4. Alternatively, it may be a dedicated TITAN connected only to the testing system and to the SONET ring.

Preferably, the step 501 would be initiated by an operator at one of the monitors, personal computers or workstations 403 on the LAN with a GUI interface. The operator would click on "circuit" and the switching offices, circuits or locations displayed for selection by the operator. Once selected, the system will query for the test to be performed and the operator simply selects a test (e.g., a bit error check on circuit 1234 at the Pittsburgh switching office) The operator does not personally identify the test device, connections to be made or the management of the shared backhaul network. The operator also does not directly interact with any other elements of the testing system. The test control software interacts with the elements over the AI network and the results of the test are displayed on the monitor for the user (see step 508 in FIG. 5). The software comprises a plurality of administrative modules running a network connectivity management package which outputs the instructions to set up the connections corresponding to the requested test to all of the nodes of the network and to the test devices to conduct operator selected tests.

From the operator's point of view, the above described functions are all invisible once they pick the circuit they want from a number of expanded databases and the test application software on central server 402 takes care of steps 502 to 505 and 507. In addition, the software also controls the bandwidth on the shared backhaul network. The circuit set-up is preferably a higher level operating system than the specific test system device so that the test system box and its software is not aware of how the circuits are set up or how the bandwidth on the backhaul network is shared.

The present invention supports a number of different test strategies. In a typical example, discussed above, the test device is passively inserted in an active circuit and simply monitors and analyzes various signals passing in each direction through the circuit transmit and receive going to and coming from both ends of the circuit). For example, to test a circuit that includes a leg between two offices, both offices might supply the circuit through the shared network to the test center for a dual passive analysis. The dual analysis might help to isolate the point along the link causing particular protocol errors.

If communications devices normally in the circuit can loop the circuit at other points, the test device may serve as transmitter and a receiver and compare received signals to the signals it sent through the circuit. In the example of the test of a circuit including a leg between two offices, if the passive analysis indicated a certain level of problems that could not be accurately diagnosed and repaired, the two offices would take the circuit out of service. The test control would instruct one office to couple the circuit through the shared network to a test device and would instruct the other office to loop the circuit back to the first office. The test device transmits signals through the first office, and the first office forwards those signals over the transmit channel of the circuit to the second office. The second office loops the test signal back to the other channel (receive channel from the perspective of the first office) and sends the signals back to the first office. The first office couples the signal from the circuit receive channel onto the receive channel going back through the shared network to the test device for analysis. In such a test, the test device might transmit a signal with errors and determine how many more errors are present in the return signal. Similar loop back testing is possible on a link to the subscriber if the terminal equipment includes a loop back device, for example in a smart network interface device.

The present invention admits of a wide range of modifications in structure and operation. For example, the above discussion has concentrated on testing of broadband digital subscriber circuits. The test systems and procedures of the invention can also test the network operations company's own digital circuits, digital voice or data trunk circuits, digital circuits between switching offices and cellular base stations and the like. In a cellular system, for example, a base station would selectively switch out a digital circuit to a test port, similar to the FAD group, then the system of the invention would backhaul the circuit to the test center, as in the above discussed embodiments. Also, testing of the various circuits may occur immediately after initial implementation as part of the procedure for certifying the digital circuits for use or during actual usage to monitor ongoing operations and/or identify technical difficulties that may have caused customer complaints or trouble reports.

The shared use communication network, such as the SONET ring 301, may also provide communications between remote test devices (not shown) and the MOC terminals and the central test control. For example, the switching office might include a remote test system (RTS) or a switch maintenance access system (SMAS). An operator using one of the MOCs could order the RTS or the SMAS to conduct certain electrical tests on a line or a trunk. The RTS or the SMAS would transmit one or more data messages through the shared network and the central test control to the MOC, to report the test results back to the operator. The system may also transmit performance monitoring data, accumulated by the communication switches, through the shared network to the test center for presentation through the MOCs to the operators.

The present invention may also facilitate centralized testing of optical communication circuits or links. In this regard, consider the simplified illustration in FIG. 6 as a representative example. In the example, pairs of optical fibers 601 carry lightwave communication signals to and from a switching office 600. Within each office 600, the fibers 601 may connect to any of a variety of different types of communication equipment, such as multiplexers and/or optical or electrical switches (not shown). The processing of the signals on the fibers by the switching office equipment may be in either the electrical domain or in the optical domain.

Figure 6:
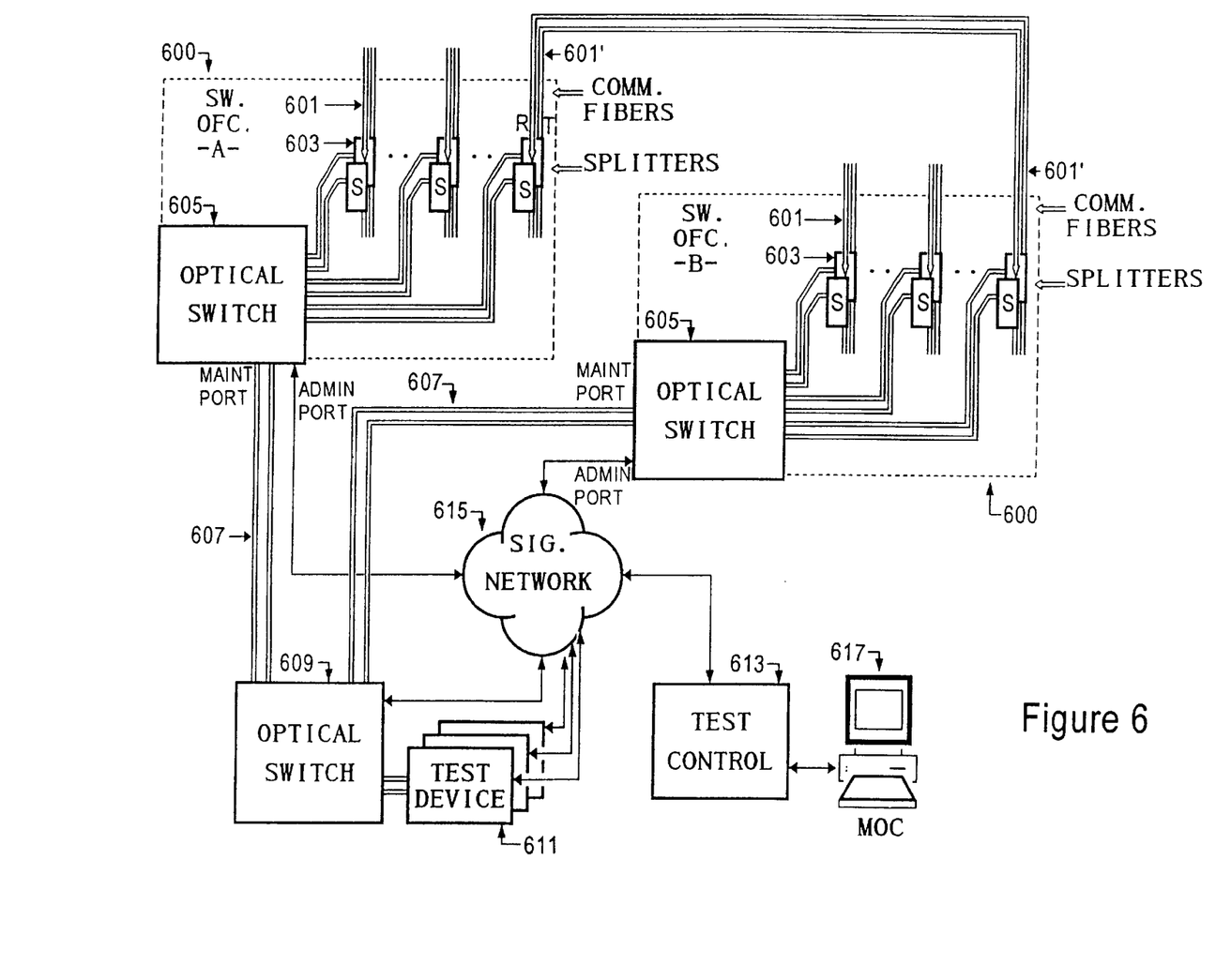
FIG. 6 is a block diagram of an alternate embodiment of the invention for centralized testing of optical links.

For testing purposes, each optical fiber 601 is coupled through an optical splitter (S) 603. Each splitter 603 passes some and preferably the majority of the optical power along the path of the optical fiber 601. However, the splitter does split off some percentage of the optical energy of the signal on the respective fiber 601. A group of the splitters 603, for example those in one switching office 600, supplies the split-off optical signals to an optical switch 605. Although not shown, the optical switch 605 may receive tapped signals from splitters in another switching office that does not include its own optical switch.

The test system tests optical fibers from two or more locations in the communication network. In the illustrated example, two switching offices 600 include the optical splitters 603 and optical switches 605. There will be more such splitters and switches for testing of fiber links at other locations in the communication network. Each optical switch 605 connects through two or more optical fibers 607 to an optical switch 609 at the test center. The optical ports coupling the switches 605 to the fibers 607 effectively become maintenance ports for the network offices 600. The fibers 607 serve as the shared use backhaul network, although other optical transport networks could be used for the connections between the switches 605 and the switch 609.

The optical switches 605 selectively connect one or more optical signals tapped off by the splitters 603 to the fibers 607 for transport to the optical switch 609 at the test center. The switch 609, in turn, selectively couples the optical signals from the fibers 607 to any one or more of the test devices 611 at the test center. Some of the test devices 611 perform appropriate protocol analysis similar to those performed in the earlier embodiments but here corresponding to the specific protocol carried on the fiber under test, e.g. SONET OC-1, OC-3, OC-12, etc.

If the optical characteristics of the optical switches 605, 609 and the inter-switch fibers 607 are known and relatively stable, the connected test device may perform optical characteristic tests to determine the state of the optical fiber link 601 itself. In such an implementation, the selected test device 611 would perform a variety of optical measurements on the signals coupled thereto. The test device 611 or some other processor (such as the control 613) would adjust the measurements to compensate for the known characteristics of the backhaul path from the fiber 601 under test to the particular test device 611.

The test system of FIG. 6 also includes a central test control 613 and a plurality of terminal devices 617 serving as MOCs (only one shown for convenience). The central test control 613 and the MOCs 617 are similar to those in either of the embodiments of FIGS. 3 and 4 and discussed above. The test control 613 and the MOCs 617 may be located in the test center with the switch 609 and the test devices 611, or the control and MOCs may be remote and interact with one or more test centers via signaling communication. The test control 613 communicates with the optical switches 605 and 609 via a signaling network 615, such as an X.25 network or a combination of a LAN and a packet data network, to control set-up and tear-down of the test links between selected fibers 601 and selected test devices 611. The test control 613 also communicates with the test devices 611 via the signaling network 615, to instruct the test devices 611 to perform selected tests and to obtain test results. The test control 613 initiates tests in response to operator or technician requests input via one of the MOCs 617 and provides test result outputs to the operator via the MOC.

A pair of fibers 601 provide transmit and receive paths between the switching office 600 and some other node of the communication network. It is possible to passively test signals on either one of the fibers in a pair, one at a time, by coupling the tapped signal from that fiber back through the switches 605, 609 to the selected test device 611. For some tests, it may be desirable to test both the transmit and receive fibers 601 at the same time. In such a case, the tapped signals from both associated splitters 603 are coupled through the switches 605, 609 to the selected test device 611.

In the present implementation, because the splitters 603 passively tap optical signals from the fibers 601, the test device need not connect serially to the link under test in the manner utilized in the earlier embodiments. However, if certain tests require imposition of a test device 611 into the circuit for pass through processing, then the optical switches 605 and 609 provide a transmit and receive path through two of the fibers 607 for looping the optical signal through the selected test device 611. In such an implementation, the splitter 603 would either perform both a splitting and combining function, or the single unit 603 for one fiber would be replaced with a splitter and a separate combiner and have two fiber connections to the associated switch 605.

In one preferred implementation, the splitters 603 perform both splitting and combining, and there are similar couplings at both ends of the fibers. Assume for example, that the transmit (T) and receive (R) pair of optical fibers, fibers 601', extend from switching office A to switching B. 'Transmit' here means transmitting from office A to office B, whereas 'receive' here means receiving at office A from office B.

Splitter/combiners 603 connect to the fibers 601' in each office A, B. The associated optical switches 605 provide selective optical couplings of both ends of the link to the maintenance port and back through fibers 607 and the optical switch 609 to one of the test devices 611. The normal communication equipment in the switching offices are controlled to terminate communications over the fiber pair 601' under test. The test device 611 can transmit a signal for coupling onto the transmit (T) fiber of the pair 601' in office A. The transmit fiber of the pair 601' carries the test signal to the office B where the splitter 603 taps off a portion of the signal. The switch 605 in office B couples the tapped signal to a fiber 607, and the switch 609 couples the signal from the fiber 607 to the particular test device 611. The test device 611 can actually compare measurements of the received signal to parameters of the original signal that the device transmitted. The test device 611 and/or the central test control adjusts the results to compensate for the known characteristics of the fibers 607 and the switches 609, as necessary, to produce measurements of the performance characteristics of the particular fiber under test. In a similar manner, the test device can transmit a test signal to the office B for insertion on the receive (R) fiber and full loop testing thereof through the office A. The test device can test various optical parameters and/or perform protocol analysis on both the transmit and the receive fibers of the pair 601'.

The embodiment of FIG. 6 also admits of a variety of modifications. For example, if the communications equipment in the switching office 600 is an optical switch, then the optical switch could selectively couple fibers 601 to the fibers 607 for transport to the test center. Such a modification would eliminate the need for the optical switches 605 and possibly the splitters 603. Effectively, the connection to the fibers 607 would correspond to the FAD maintenance ports in the embodiments of FIGS. 3 and 4.

While the foregoing has described what is considered to be the preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. A testing system for testing circuits in a distributed digital communications network, said system comprising:

a test center having a plurality of test devices;

a shared use network for connecting said test center to a plurality of communication switches at two or more locations in said distributed digital communications network; and a central controller for sending an instruction to one of said communication switches, said instruction causing one communication switch to selectively couple a circuit to be tested to said test center via said shared use network, wherein one of said plurality of test devices in said test center is controllably connected to said circuit to be tested for remotely performing one or more tests of said circuit.

2. The testing system as recited in claim 1, wherein said shared use network comprises wide-band digital links from maintenance ports of the communication switches to a switch in the test center, and the switch in the test center selectively couples the wide-band digital links to the test devices.

3. The testing system as recited in claim 2, wherein the wide-band digital links comprise optical fibers.

4. The testing system as recited in claim 1, wherein said test center is located at a central location remote from at least two of said communication switches, and the bandwidth of said shared use network is distributed among the communication switches.

5. The testing system as recited in claim 4, wherein the central controller controls the bandwidth of said shared use network so that it is dynamically allocated in conjunction with testing through the communication switches.

6. The testing system as recited in claim 5, wherein the bandwidth of said shared use network is reallocated at substantially the same time the central controller sends the instruction to the one communication switch.

7. The testing system as recited in claim 4, wherein said shared use network comprises a SONET fiber optic ring.

8. The testing system as recited in claim 7, wherein said test center further comprises a switch, and said one communication switch provides selective connections of T1 circuits between a maintenance port of said one communication switch and the plurality of test devices via said SONET fiber optic ring and the test center switch.

9. The testing system as recited in claim 8, wherein the SONET fiber optic ring routes a T1 connection from both sides of the maintenance port of the one communication switch to said test center switch.

10. The testing system as recited in claim 9, wherein the test center switch selectively couples the T1 connections to the plurality of test devices in response to instructions from said central controller.

11. The testing system as recited in claim 10, wherein the said test devices initiate tests in response to instructions from said central controller.

12. The testing system as recited in claim 11, wherein said central controller communicates with said communication switches, said test center switch and said plurality of test devices via a signaling network.

13. The testing system as recited in claim 12, wherein said plurality of test devices comprises at least one protocol analyzer, and said test center comprises said central controller and at least one associated maintenance and operation console.

14. The testing system as recited in claim 13, wherein said plurality of test devices report test results through said signaling network for display on said at least one maintenance and operation console.

15. The testing system as recited in claim 12, wherein the signaling network is a packet data network.

16. The testing system as recited in claim 1, wherein said circuit to be tested comprises a data communications circuit communicating data, and said one or more tests are made of the data communicated over said data communication circuit.

17. A testing system for testing communication links in a distributed communications network, said system comprising:

a test center having a plurality of test devices;

a shared use network for connecting said test center to maintenance ports of a plurality of offices in said distributed communications network at two or more locations remote from the test center; and a central controller for sending an instruction to one of said offices, said instruction causing the said one office to selectively couple a communication link to be tested to a maintenance port of said one office in order to connect the link to be tested from said one office to said test center via said shared use network, wherein one of said plurality of test devices in said test center is controllably connected to said link to be tested for remotely performing one or more tests of said link.

18. The testing system as recited in claim 17, wherein said link to be tested comprises an optical link, and said shared use network comprises an optical fiber carrying an optical signal from the maintenance port of the one office to the test center.

19. The testing system as recited in claim 18, wherein the shared use network comprises optical fiber links from the maintenance ports to the test center, and the test center further comprises an optical switch for selectively coupling the test devices to the optical fiber links.

20. The testing system as recited in claim 19, wherein at least one of the test devices comprises an optical measurement device.

21. The testing system as recited in claim 19, wherein at least one of the test devices comprises a protocol analyzer adapted for analysis of optical signal protocols.

22. The testing system as recited in claim 17, wherein the one office comprises a digital communication switch, the link to be tested comprises a digital circuit, and the shared use network provides dynamically allocated bandwidth for transporting electrical digital signals from the circuit to be tested.

23. The testing system as recited in claim 22, wherein said shared use network comprises a SONET fiber optic ring.

24. The testing system as recited in claim 23, wherein said test center further comprises a digital switch, and said one office provides selective connections of digital circuits through the maintenance port of said one office, said SONET fiber optic ring and the digital switch of the test center to the plurality of test devices.

25. The testing system as recited in claim 24, wherein the SONET fiber optic ring routes two T1 connections from the maintenance port of the one office to the digital switch of the test center.

26. The testing system as recited in claim 25, wherein the digital switch of the test center selectively couples the T1 connections to the plurality of test devices in response to instructions from said central controller.

27. A testing method for testing circuits in a distributed digital communications network, said method comprising the steps of:

providing a plurality of test devices at a test center;

connecting said test center to a plurality of communication switches included respectively in a corresponding plurality of switching offices in said distributed digital communications network via a shared backhaul network;

sending an instruction from a central controller to one of said switching offices, said instruction causing the communication switch included in one of said switching offices to selectively couple a circuit to be tested to a maintenance port of the communication switch in order to connect said circuit to be tested from said communication switch to said test center via said shared backhaul network;

controllably connecting one of said plurality of test devices to said circuit; and remotely performing one or more tests of said circuit using said one test device.

28. The testing method as recited in claim 27, wherein said method further comprises the step of distributing the bandwidth of said shared backhaul network among the switching offices.

29. The testing method as recited in claim 28, wherein said shared backhaul network comprises a SONET fiber optic ring.

30. The testing method as recited in claim 27, wherein said method comprises the further step of controlling the bandwidth of said shared backhaul network so that it is dynamically allocated among the switching offices in conjunction with testing through said communication switches.

31. The testing method as recited in claim 30, wherein said method comprises the further step of reallocating the bandwidth of said shared backhaul network among the switching offices at substantially the same time the central controller sends the instruction to the one switching office.

32. The testing method as recited in claim 30, wherein the step of controllably connecting comprises providing selective connections of T1 circuits between the maintenance port of said one communication switch and the plurality of test devices via said SONET fiber optic ring and a digital switch in the test center.

33. The testing method as recited in claim 32, wherein said step of providing selective connections of T1 circuits comprises routing a T1 connection from both sides of the circuit to be tested to said digital switch.

34. The testing method as recited in claim 27, comprising the further step of selectively coupling the circuit to be tested from the shared backhaul network through a digital switch to the plurality of test devices in response to instructions from said central controller.

35. The testing method as recited in claim 34, wherein the plurality of test devices initiates tests in response to instructions from said central controller.

36. The testing method as recited in claim 35, wherein said central controller communicates with said communication switches, said digital switch and said plurality of test devices via a packet data network.

37. The testing method as recited in claim 36, wherein said plurality of test devices report test results through said packet data network for display on a maintenance and operation console.

38. The testing method as recited in claim 27, wherein said method tests a data communications circuit communicating data, and said one or more tests are made of data communicated over said data communications network.

39. A testing center for testing links in a distributed communications network, said testing center comprising:

a plurality of test devices;

a maintenance and operations console;

a central controller, coupled for communication with test devices and said maintenance and operations console, for instructing said test devices to conduct one or more tests of said links in said distributed communications network in response to a test request entered by an operator at said maintenance and operations console; and a switch, for connection to switching offices in said distributed communications network via a shared backhaul network under the control of said central controller for selectively connecting said links to said test devices.

40. The testing center as recited in claim 39, wherein said plurality of test devices comprises at least one protocol analyzer.

41. The testing center as recited in claim 39, wherein the switch comprises a digital switch.

42. The testing center as recited in claim 39, wherein said plurality of test devices comprises at least one optical measurement device.

43. The testing center as recited in claim 39, wherein the switch comprises an optical switch.

44. The testing center as recited in claim 39, wherein said plurality of test devices report test results through a local area network for display on the maintenance and operation console.

45. A testing method for testing a circuit in a distributed digital communications network, said method comprising the steps of:

displaying a graphical user interface on a display of a maintenance and operations console;

receiving inputs from an operator of said maintenance and operations console and recognizing inputs from said operator constituting a request to test one or more circuits in said distributed digital communications network, in response to said test request, connecting said test center to a selected one of a plurality of communication switches included respectively in a corresponding plurality of switching offices in said distributed digital communications network via a shared backhaul network;

sending an instruction from a central controller to the one communication switch, said instruction causing the one communication switch to interrupt a circuit to be tested and couple it to a maintenance port of the one communication switch in order to connect said circuit to be tested from said one communication switch to said test center via said shared backhaul network; and sending an instruction to one or more test devices, said instruction causing said one or more test devices to remotely perform one or more tests of said circuit.

46. The testing method as recited in claim 45, wherein said shared backhaul network comprises a SONET fiber optic ring and wherein said method further comprises, in response to said request for a test by an operator of said maintenance and operations console, sending instructions to add/drop multiplexers of said SONET fiber optic ring to control connection of said switching offices to said test center.

47. The testing method as recited in claim 46, wherein said instructions to said add/drop multiplexers allocate the bandwidth of said SONET fiber optic ring.

48. The testing method as recited in claim 47, wherein said method further comprises, in response to said request for a test, sending instructions to said switching offices and to said add/drop multiplexers of said SONET fiber optic ring to disconnect said circuits and to reallocate the bandwidth on said SONET fiber optic ring.

49. The testing method as recited in claim 45, wherein said method comprises the further step of displaying results of said one or more tests on said maintenance and operations console.

50. A test system, comprising:

a first plurality of optical splitters for coupling to a first set of optical fibers of a distributed communication network and tapping off optical signals therefrom;

a first optical switch for selectively coupling the tapped optical signals from the first optical splitters to a port;

a second plurality of optical splitters for coupling to a second set of optical fibers of the distributed communication network and tapping off optical signals therefrom;

a second optical switch for selectively coupling the tapped optical signals from the second optical splitters to a port;

a third optical switch located at a remote test center;

optical fibers coupled between the ports of the first and second optical switches and the third optical switch; and a plurality of test devices, responsive to optical signals and coupled to the third optical switch.

51. A test system as in claim 50, wherein at least one of the test devices performs optical tests.

52. A test system as in claim 50, wherein at least one of the test devices comprises a protocol analyzer.

53. A test system as in claim 50, further comprising:

a central test control;

a maintenance and operations console, for providing a user interface for an operator, coupled for communication with the central test control; and a signaling network providing communications between the central test control and the optical switches and between the central test control and the test devices.

* * * * *